United States Patent [19]
Ogawa

[11] 4,408,241
[45] Oct. 4, 1983

[54] CLEANING DEVICE

[75] Inventor: Kenji Ogawa, Kiyose, Japan

[73] Assignee: Bruce R. Maier, Columbia, Mo.

[21] Appl. No.: 271,948

[22] Filed: Jun. 9, 1981

[51] Int. Cl.$^3$ .......................... G11B 5/10; G11B 5/41; G11B 3/58; B47L 25/00

[52] U.S. Cl. ............................... 360/128; 15/210 R; 360/137

[58] Field of Search ..................... 360/128, 130.2, 137; 15/210 R

[56] References Cited

U.S. PATENT DOCUMENTS

| | | | |
|---|---|---|---|
| 3,789,452 | 2/1974 | Nemoto | 360/128 |
| 3,810,230 | 5/1974 | Orlowski et al. | 360/128 |
| 3,931,643 | 1/1976 | Kuroe | 360/128 |
| 4,065,798 | 12/1977 | Sugisaki | 360/128 |
| 4,266,256 | 5/1981 | Kato | 360/128 |

FOREIGN PATENT DOCUMENTS

| | | |
|---|---|---|
| 48-15859 | 5/1973 | Japan . |
| 51-2597 | 1/1976 | Japan . |
| 51-52965 | 12/1976 | Japan . |
| 52-4453 | 2/1977 | Japan . |
| 52-6262 | 2/1977 | Japan . |
| 52-118617 | 9/1977 | Japan . |

*Primary Examiner*—Robert Martin Kilgore
*Attorney, Agent, or Firm*—Hume, Clement, Brinks, Willian & Olds, Ltd.

[57] ABSTRACT

A cleaning device for magnetic tape heads comprises a mylar tape on which is deposited a layer of a low-tack adhesive. A dacron fabric is bonded to the mylar tape by the adhesive layer. This dacron tape acts as a mechanical cleaning surface when it is moved across the contact surface of the tape head. The adhesive layer operates both to secure individual strands of the fabric rigidly in place so as to support the strands properly when they are in contact with the tape head, and also to capture and control the movement of magnetic particles dislodged from the tape head by the strands of the fabric. Alternate embodiments provide ridges for defining a pattern of raised projections extending away from an underlying base.

25 Claims, 9 Drawing Figures

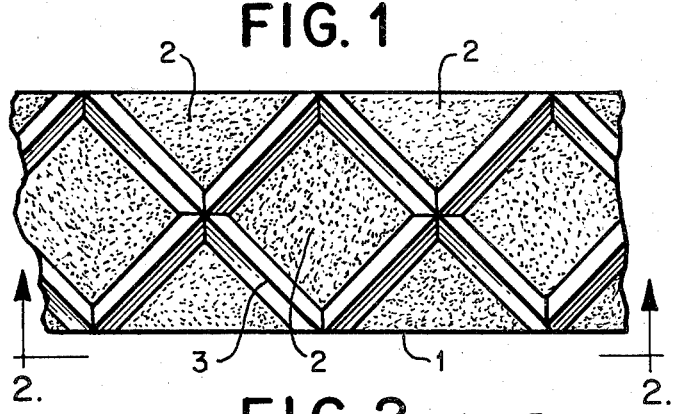
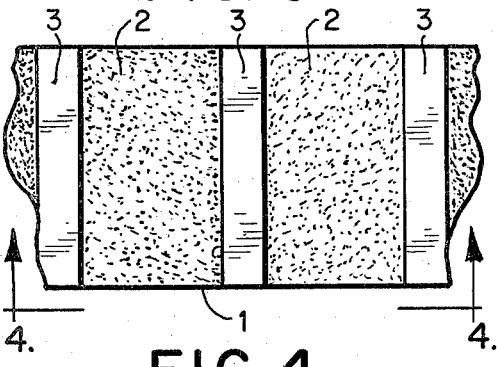
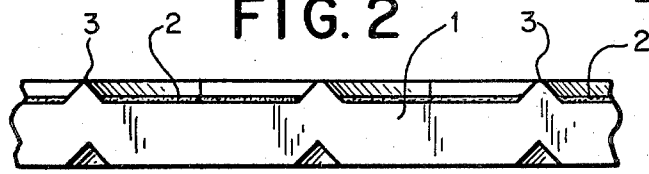
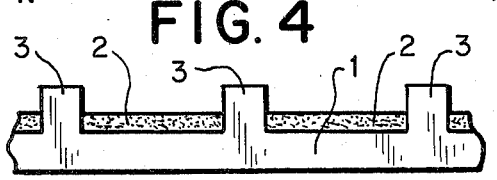
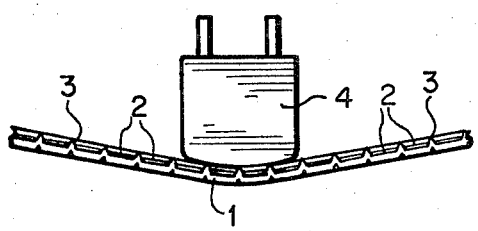
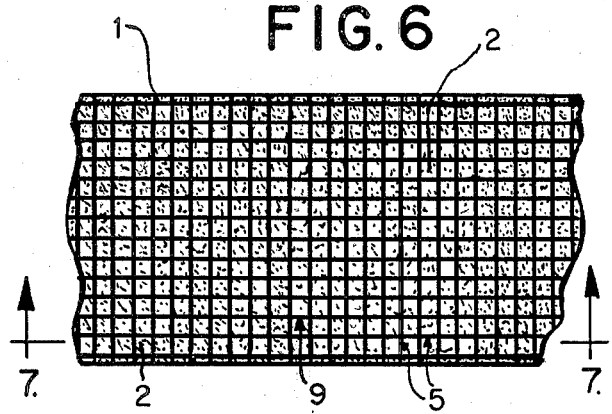
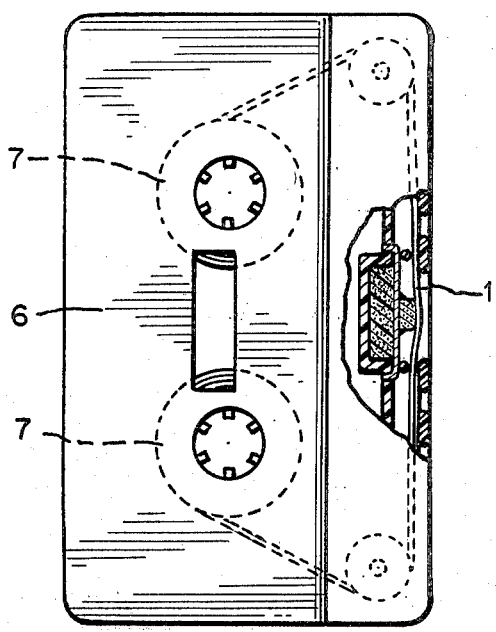
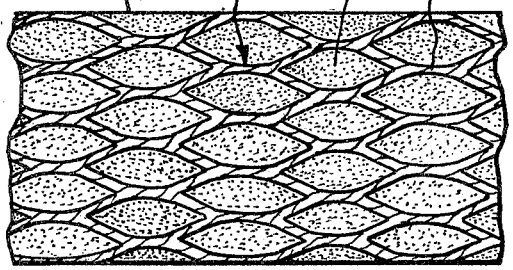

CLEANING DEVICE

BACKGROUND OF THE INVENTION

The present invention relates to a cleaning device for contact-type information transducing heads, such as for magnetic read or write heads, for example. In particular this invention relates to such a cleaning device which can be used without solvents or other fluids, and which collects material removed from transducing heads.

It is well known that the characteristics of contact-type transducing heads, such as read or write heads in a magnetic tape player, for example, determine the accuracy and precision with which information is read or written. Furthermore, undesired materials on the contact surface of a transducing head can greatly reduce the precision and accuracy with which the transducing head operates. For example, magnetic particles that have become dislodged from a magnetic recording medium as it runs on the contact surface of a magnetic transducing head and have adhered to the head can cause significant deterioration in the performance of the magnetic transducer head.

Various types of cleaning materials have in the past been used to clean transducing heads which have become degraded as described above. A first approach utilizes fluids to remove undesired deposits from the transducing heads chemically. A second approach utilizes a tape, such as a hard flat tape or a tape provided with a abrasive surface, which is run on the contact surface of the transducing head to remove magnetic particles attached to the head.

Although such methods may clean the head's contact surface, each presents disadvantages. For example, when fluids of the type described above are used to clean the recording or playback transducer heads of a magnetic tape player, such fluids can damage pressure rollers or other components of the tape player. Furthermore, magnetic particles removed from transducing heads by cleaning tapes of the prior art tend to fly and scatter around the head and may become deposited on guide pins, capstans, pressure rollers, idler motors, and other components. Such magnetic particles can cause undesirable noise, wow, and flutter which may degrade the performance of the tape player to an undesirable extent. In some cases, it may be necessary to overhaul a tape player at considerable cost to remove such deposits of magnetic particles from the interior of the player.

SUMMARY OF THE INVENTION

The present invention is directed to an improved cleaning device adapted for use with transducing heads, which to a large extent overcomes the foregoing disadvantages of the prior art. The cleaning device of this application is well suited for use with contact-type transducing heads, such as magnetic recording or playback heads, for example.

According to this invention, a cleaning device for a contact-type information transducing head is provided which comprises a base, means for defining a plurality of raised areas projecting away from at least one surface of the base, and an adhesive deposited on the at least one surface of the base between the plurality of raised areas.

In operation, the adhesive deposited on the base between the raised areas acts to capture material removed from a transducing head by the raised areas. In this way, materials such as magnetic particles removed from tape heads can be controlled and substantially prevented from depositing on other portions of the information recording or reading system. Furthermore, this invention can operate entirely without the need for fluids to remove deposits from the transducing head chemically.

The invention itself, together with further objects and attendant advantages, will best be understood by reference to the following detailed description taken in conjunction with the accompanying drawings.

BRIEF DESCRIPTION OF THE DRAWINGS

FIG. 1 is a top view of a tape of a first preferred embodiment of the present invention, which includes a diamond pattern of ridges.

FIG. 2 is a side view taken along line 2—2 of FIG. 1.

FIG. 3 is a top view of a tape of a second preferred embodiment which includes a parallel pattern of ridges.

FIG. 4 is a side view taken along line 4—4 of FIG. 3.

FIG. 5 is a schematic view of the tape of FIGS. 1-2 in operation cleaning a tape head.

FIG. 6 is a top view of a tape of a third preferred embodiment which includes a rectangular grid pattern of ridges.

FIG. 7 is a cross-sectional view taken along line 7—7 of FIG. 6.

FIG. 8 is a top view of a tape of a fourth preferred embodiment which includes a hexagonal grid pattern of ridges.

FIG. 9 is a schematic view of a tape cassette in which is mounted the tape of FIGS. 6-7.

DETAILED DESCRIPTION OF THE PRESENTLY PREFERRED EMBODIMENTS

Turning now to the drawings, FIGS. 1 and 2 show a top view of a tape of a first preferred embodiment of the invention. This tape includes an elongated base 1 into which is stamped a raised spacer pattern which defines a pattern of raised areas. As shown in FIGS. 1 and 2 the raised areas of this embodiment are arranged in a diamond pattern as a plurality of intersecting ridges 3. In this embodiment, each of the ridges 3 is substantially triangular in cross-section. A layer of adhesive 2 is deposited on the base 1 between the raised ridges 3 such that the adhesive 2 substantially fills the area between the ridges 3. As shown in FIG. 2 the uppermost portions of the ridges 3 are preferably not covered with adhesive.

FIGS. 3 and 4 show a tape of a second preferred embodiment of this invention which also includes an elongated base 1. This base 1 defines a plurality of parallel ridges 3 extending across the width of the base 1. As shown in FIGS. 3 and 4, a layer of adhesive 2 is deposited on the base 1 between the ridges 3. As before, the uppermost portions of the ridges 3 extend away from the layer of adhesive 2 and are preferably not covered by adhesive. The parallel ridges 3 of FIGS. 3 and 4 are spaced and parallel, similar to the wooden teeth of Japanese clogs.

FIG. 5 shows a schematic representation of the first preferred embodiment of FIGS. 1 and 2 in operation. As shown in FIG. 5, the uppermost portions of the ridges 3 rub across the contacting surface of a transducing head 4. This transducing head 4 can for example be a read head or a write head in a magnetic tape player or recorder. As the tips of the ridges 3 move across the contact surface of the transducer head 4, the ridges 3 serve to remove magnetic particles attached to the head 4. These removed magnetic particles are captured by the adhesive 2 and are thereby prevented from dispersing throughout the system of which the head 4 is a part. Thus, the cleaning device of this invention is easy to use, does not require the use of cleaning fluids, and substantially prevents the scattering or dispersal of magnetic particles removed from the head 4.

Turning now to FIGS. 6 and 7, a third preferred embodiment of the present invention employs a base 1 formed of a mylar tape. Overlying the mylar base 1 is a layer of an adhesive 2. Preferably, this adhesive is an organic, low-tack adhesive which is sprayed onto one entire surface of the mylar base 1. Overlying portions of the adhesive layer 2 is a layer of open weave fabric 9. As shown in FIG. 7, this layer of fabric 9 is formed of a plurality of spaced strands 5 which are held in place on the mylar base 1 by means of the adhesive 2. The adhesive 2 thus serves to bond individual strands 5 in place securely and to provide positive support to the strands 5 during the cleaning operation. Preferably, this fabric 9 is formed of a plastic material such as dacron. Other fabrics such as acrylic or nylon fabrics may be used in alternate embodiments of this invention. In all cases, however, the fabric 9 should be made of a material which is softer than the surface of the transducing head to be cleaned. In this way undesirable abrasion and wear of the transducing head are minimized. Preferably, the fabric 9 is a coarse weave fabric which allows a major portion of the layer of adhesive 2 to be exposed between adjacent strands 5.

In manufacturing the embodiment of FIGS. 6 and 7 it is preferable to start with a wide mylar tape of approximately two inches in width. The adhesive layer 2 is then sprayed on the tape while dissolved in a volatile solvent such that the adhesive layer remains after the solvent has evaporated. Once the adhesive layer 2 has been applied, the fabric 9 is then pressed onto the adhesive layer 2 in order to bond the fabric 9 to the tape by means of the adhesive 2. After the fabric 9 has been bonded suitably, the tape is then slit longitudinally into pieces of the desired width. Preferably, the finished width of the base 1 should be equal to that of the recording tape normally used in the equipment to be cleaned. In assembling the fabric 9 on the tape it is preferable to control humidity to a point no greater than the lowest humidity at which the assembled cleaning device will be used and stored. In this way differential contraction between the fabric 9 and the base 1 as a function of humidity variations can be substantially eliminated as a cause of puckering of the tape.

In the preferred embodiment of FIGS. 6-7 the mylar base 1 is 0.061 mm in thickness and the finished base 1 is 3.81 mm in width. Each of the strands 5 is formed of two twisted pairs of monofilaments 5', each of which is formed of dacron. The overall thickness of the fabric 9 is about 0.094 mm and the thickness of individual strands 5 is about 0.033-0.038 mm. The average spacing between centers of adjacent strands 5 along the length of the base 1 is 0.25 mm and the average spacing between adjacent strands 5 across the width of the base 1 is about 0.25 mm. Thus, about fourteen strands 5 extend along the length of the base 1. Preferably the adhesive 2 is a low tack organic adhesive which preferentially bonds to mylar more securely than to any other material with which it is likely to come into contact in use. In this way the adhesive 2 is prevented from pulling off onto the contact surface of the head 4.

FIG. 8 shows a tape of a fourth preferred embodiment which utilizes a base 1 and a layer of adhesive 2 similar to the corresponding elements of the embodiment of FIGS. 6-7. This fourth embodiment includes a hexagonal weave fabric 10 which is formed of strands 8, each of which is in turn formed of a twisted pair of dacron monofilaments about 0.036 mm in diameter. In this embodiment the hexagonal cells of the fabric 10 define internal angles of 48° and 156°, the dimensions of individual hexagonal cells are 0.86 mm across the width of the base 1 and 1.8 mm along the length of the base 1. The embodiment of FIG. 8 is assembled in a manner similar to that described above in connection with FIGS. 6-7.

Any one of the four embodiments described above can be installed in a standard cassette of the type shown in FIG. 9. Such a cassette includes a cassette housing 6 and two hubs 7 mounted for rotation in the housing 6. When so mounted, the cleaning device of this invention can be readily and conveniently used in the same manner as a conventional magnetic tape cassette. The cassette 6 is simply installed in a tape player and the tape player controls are operated to cause the base 1 to be moved across the recording and playback transducer heads. In the embodiment of FIG. 9, the length of the base 1 is adequate to provide fifteen seconds of "play" at a tape transport speed of $1\frac{7}{8}$ inch per second. In this way the transducer heads can readily be cleaned without special procedures or tools. It should be noted that the cleaning devices shown in the figures can readily be handled in conventional tape transport systems without special precautions because the base 1 can be wound on a hub without sticking to itself. This is due to the manner in which the ridges 3 or fabric 9,10 serves to shield the adhesive layer 2.

From the foregoing, it should be apparent that an improved cleaning device has been described which operates cleanly and easily without the need for cleaning fluids and while substantially controlling the movement of deposits removed from transducer heads.

It should be understood that the present invention is not limited to use with any particular contact-type transducer head. On the contrary, this invention can be used both with magnetic transducer heads (such as those used in audio tape systems, video tape systems, and computer storage tape systems, for example) as well as with other types of contact-type transducer heads (such as capacitance sensing transducer heads of the type used with one type of video disc). Furthermore, the present invention is not limited to use with tape type storage media, but can readily be adapted for use with other types of storage media such as discs, drums, and the like. In some applications it may be desirable to apply a raised pattern of ridges on both sides of a cleaning device such as a tape in order to clean other components, such as pinch rollers, simultaneously with the cleaning of transducers heads. In alternate embodiments of this invention the pattern of raised areas may be built up of disconnected regions rather than ridges or strands. Of course, the dimensions and materials described above can readily be altered if desired.

It is therefore intended that the foregoing detailed description be regarded as illustrative of various embodiments of the present invention rather than limiting, and that it be understood that it is the following claims, including all equivalents, which define the scope of the present invention.

I claim:

1. A cleaning device for a contact-type information transducing head comprising:

a base;

means for defining a plurality of raised areas projecting away from at least one surface of the base, said raised areas adapted to remove material from and clean the transducing head; and an adhesive deposited on the at least one surface of the base between the plurality of raised areas, said adhesive adapted to capture material removed from the transducing head by the raised areas.

2. The invention of claim 1 wherein the means for defining the plurality of raised areas comprises a plurality of strands secured to the at least one surface of the base.

3. The invention of claim 2 wherein the plurality of strands are arranged in a fabric.

4. The invention of claim 3 wherein the plurality of strands define a rectangular grid pattern.

5. The invention of claim 3 wherein the plurality of strands define a hexagonal grid pattern.

6. The invention of claim 1 wherein the base comprises an elongated tape.

7. The invention of claim 6 further comprising:
a cassette housing;
two hubs mounted for rotation in the cassette housing; and
means for mounting the tape to the hubs in the cassette housing such that rotation of the hubs causes the tape to move.

8. A cleaning device for a magnetic information transducing head comprising:
a cleaning tape;
means for defining a raised spacer pattern on at least one side of the tape; and
an adhesive deposited on the at least one side of the cleaning tape in the areas between the spacer pattern.

9. The invention of claim 8 wherein the means for defining a raised spacer pattern comprises a plurality of raised ridges on the at least one side of the cleaning tape.

10. The invention of claim 8 wherein the defining means comprises a plurality of strands secured to the at least one side of the cleaning tape, said plurality of strands cooperating to define the raised spacer pattern.

11. The invention of claim 10 wherein the plurality of strands are arranged in a fabric.

12. The invention of claim 11 wherein the plurality of strands define a rectangular grid pattern.

13. The invention of claim 11 wherein the plurality of strands define a hexagonal grid pattern.

14. The invention of claim 8 further comprising:
a tape cassette housing;
two hubs mounted for rotation in the housing; and
means for mounting the tape to the hubs such that rotation of the hubs causes the tape to move.

15. A cleaning device for a magnetic information transducing head comprising:
a cleaning tape;
a layer of adhesive bonded to one surface of the cleaning tape; and
a plurality of elongated strips bonded to the adhesive;
said plurality of strips cooperating to define a pattern of raised areas, the spacing of said plurality of strips chosen to expose regions of the layer of adhesive between the strips so that material removed from the head by said plurality of strips adhesively bonds to the adhesive.

16. The invention of claim 15 wherein the plurality of elongated strips are woven to form a fabric.

17. The invention of claim 15 wherein the plurality of strips define a rectangular grid pattern.

18. The invention of claim 15 wherein the plurality of strips define a hexagonal grid pattern.

19. The invention of claim 11 further comprising:
a tape cassette housing;
two hubs mounted for rotation in the housing; and
means for mounting the tape to the hubs such that rotation of the hubs causes the tape to move.

20. A cleaning device for a magnetic information transducing head comprising:
a cleaning tape;
a layer of adhesive bonded to one surface of the tape;
a fabric bonded to the layer of adhesive, said fabric having a hardness sufficient to clean and remove material from the head, substantially without damaging the head;
said fabric comprising a plurality of strands, the spacing between adjacent strands chosen to expose regions of the layer of adhesive between the strands such that material removed from the head by the fabric is captured by the adhesive.

21. The invention of claim 20 further comprising:
a tape cassette housing;
two hubs mounted for rotation in the housing; and
means for mounting the tape to the hubs such that rotation of the hubs causes the tape to move.

22. The invention of claim 20 wherein the plurality of strands define a rectangular grid pattern.

23. The invention of claim 20 wherein the plurality of strands define a hexagonal grid pattern.

24. A method for cleaning a magnetic information transducing head in a magnetic tape player comprising:
providing a cleaning tape having a plurality of elongated strips defining a raised spacer pattern on at least one side of the tape and an adhesive deposited on the at least one side of the cleaning tape in the areas between the spacer pattern;
moving the cleaning tape across the transducing head so that the raised spacer pattern rubs against the transducing head to remove material; and
capturing the removed material on the adhesive.

25. A method for cleaning a magnetic information transducing head in a cassette player comprising:
providing a cleaning cassette including:
a cleaning tape;
means for defining a plurality of raised areas projecting away from at least one surface of the tape;
an adhesive deposited on the at least one surface of the tape between the plurality of raised areas;
a tape cassette housing;
two hubs mounted for rotation in the housing; and
means for mounting the tape to the hubs such that rotation of the hubs causes the tape to move;
inserting the cleaning cassette into the cassette player;
rotating the hubs of the cleaning cassette so that as the tape moves, the plurality of raised areas rubs against the transducing head to remove material from the head; and
adhesively bonding material removing from the transducing head to the adhesive.

* * * * *

UNITED STATES PATENT AND TRADEMARK OFFICE
CERTIFICATE OF CORRECTION

PATENT NO. : 4,408,241
DATED : October 4, 1983
INVENTOR(S) : Kenji Ogawa

It is certified that error appears in the above-identified patent and that said Letters Patent is hereby corrected as shown below:

Column 6, Claim 25, line 65, please delete "removing", and substitute therefor --removed--.

Signed and Sealed this

Twenty-sixth Day of February 1985

[SEAL]

Attest:

DONALD J. QUIGG

Attesting Officer  Acting Commissioner of Patents and Trademarks